US006197394B1

(12) United States Patent
Mild et al.

(10) Patent No.: US 6,197,394 B1
(45) **Date of Patent: *Mar. 6, 2001**

(54) IN-LINE COATING AND CURING A CONTINUOUSLY MOVING WELDED TUBE WITH AN ORGANIC POLYMER

(75) Inventors: Edward E. Mild, Frankfort; Stephen E. Seilheimer, N. Aurora, both of IL (US)

(73) Assignee: Allied Tube & Conduit Corporation, Harvey, IL (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/476,506

(22) Filed: Jun. 7, 1995

(51) Int. Cl.[7] .......... B29D 22/00; F16L 9/147; B05D 1/04

(52) U.S. Cl. .......... 428/36.9; 428/36.91; 428/35.8; 428/35.9; 138/143; 138/146; 29/460; 427/475; 427/482; 427/485; 427/409

(58) Field of Search .......... 428/35.8, 35.9, 428/36.9, 36.91; 138/143, 144, 146; 28/460, 33 D; 427/409, 475, 482, 485, 486

(56) References Cited

U.S. PATENT DOCUMENTS

| | | | | |
|---|---|---|---|---|
| 3,122,114 | | 2/1964 | Krengel | 113/33 |
| 3,161,530 | | 12/1964 | Strobel | 117/18 |
| 3,226,817 | | 1/1966 | Simborg et al. | 29/430 |
| 3,230,615 | | 1/1966 | Krengel et al. | 29/200 |
| 3,256,592 | | 6/1966 | Krengel et al. | 29/200 |
| 3,259,148 | | 7/1966 | Krengel et al. | 138/145 |
| 3,559,280 | | 2/1971 | Mailhiot et al. | 29/527.4 |
| 3,561,096 | | 2/1971 | Krengel et al. | 29/460 |
| 3,616,983 | | 11/1971 | Kamimura et al. | 228/5 |
| 3,667,095 | | 6/1972 | Ostrowski et al. | 29/33 |
| 3,761,530 | | 9/1973 | Van Venrooy | 260/668 |
| 3,965,551 | * | 6/1976 | Ostrowski | 29/33 D |
| 4,344,381 | | 8/1982 | Ostrowski et al. | 118/626 |
| 4,352,838 | | 10/1982 | Bostroem | 427/209 |
| 4,355,887 | | 10/1982 | Sorimachi | 355/25 |
| 4,582,718 | | 4/1986 | Escallon | 427/32 |
| 4,749,125 | | 6/1988 | Escallon et al. | 239/3 |
| 4,758,455 | * | 7/1988 | Campbell et al. | 428/36.91 |
| 4,851,065 | * | 7/1989 | Curtz | 428/35.8 |
| 5,028,464 | * | 7/1991 | Shigetoh | 428/35.9 |
| 5,071,687 | * | 12/1991 | Shigetoh | 428/35.9 |
| 5,086,973 | | 2/1992 | Escallon et al. | 239/3 |
| 5,165,601 | | 11/1992 | Rodenberger et al. | 239/3 |

(List continued on next page.)

FOREIGN PATENT DOCUMENTS

| | | |
|---|---|---|
| 1446766 | 8/1959 | (DE) . |
| 1813552 | 12/1967 | (DE) . |
| 1912214 | 3/1968 | (DE) . |
| WO9300453 | 1/1993 | (WO) . |

OTHER PUBLICATIONS

Polymers, Paint and Coulor Journal, Powder Coating—today's technology, A. Van de Werff, Scando B.V., Jan. 9, 1980.

*Primary Examiner*—Rena L. Dye
(74) *Attorney, Agent, or Firm*—Banner & Witcoff, Ltd.

(57) ABSTRACT

A tube product and improvement in the production of coating tubing, as most preferred, includes hot dip galvanize zinc coating of tubing, and before solidification of the zinc coating, clear coating of the tubing with organic polymer coating. The heat of the hot dip cures the clear coating, and the clear coating preserves a consistency and reflectivity of the zinc previously unseen in finished products. In additional preferred embodiments, organic polymer coatings are applied to zinc coated and uncoated tubing, and the organic polymer coatings are applied by electrostatic powder coating.

18 Claims, 3 Drawing Sheets

U.S. PATENT DOCUMENTS

| | | | | |
|---|---|---|---|---|
| 5,245,779 | * | 9/1993 | Suzue et al. | 428/36.91 |
| 5,279,863 | | 1/1994 | Escallon | 427/477 |
| 5,393,609 | * | 2/1995 | Chang et al. | 428/357 |
| 5,397,636 | * | 3/1995 | Miyao et al. | 428/35.9 |
| 5,407,747 | * | 4/1995 | Sammel et al. | 428/418 |
| 5,453,302 | | 9/1995 | Chaudhry et al. | 427/430.1 |
| 5,506,002 | | 4/1996 | Maitra et al. | 427/420 |
| 5,520,223 | * | 5/1996 | Iorio et al. | 428/35.9 |
| 5,571,570 | | 11/1996 | Lake | 427/494 |

* cited by examiner

IN-LINE COATING AND CURING A CONTINUOUSLY MOVING WELDED TUBE WITH AN ORGANIC POLYMER

BACKGROUND OF THE INVENTION

This invention relates to in-line coating of a continuously moving substrate, such as a tube or conduit, of the type used for applications such as metal fencing or electrical conduit. More specifically, this invention relates to galvanizing and overcoating of such substrates.

The art of forming and coating tubes and conduits for fencing and electrical conduit is an old art. Many manufacturing operations exist which use techniques decades old. As an example, modern galvanizing procedures have been described as the outdated inheritance of original hot dip galvanizing in which cold articles were dipped in heated zinc pots. See U.S. Pat. No. 4,352,838 at column 1, lines 13–19.

While the art is old, significant advances have been made by industry leaders. These advances include the advance of PCT Publication No. WO 93/0045 published Jan. 7, 1993, the advance of U.S. Pat. No. 5,364,661 issued Nov. 15, 1994, and the advance of U.S. Pat. No. 5,506,002, issued Apr. 19, 1996. As reflected in these patents and publication, galvanizing of continuous tubes and conduits has progressed to the point of rapid speeds of the tubes and conduits to be galvanized, on the order of six hundred feet per minute. Galvanizing has also progressed through the elimination of secondary or elevated zinc containers in favor of zinc pumped through cross-tees, spray nozzles and drip nozzles. Zinc application dwell times have been reduced to tenths of seconds, and contact zones to inches.

Industry leaders have also advanced the application of non-metal coatings, as well, as shown in U.S. Pat. No. 5,453,302, issued Sep. 26, 1995. As in this patent, protective coatings are applied by vacuum coating apparatus.

Applications of coatings through alternate coating technologies have also been disclosed. As shown in U.S. Pat. Nos. 3,559,280 issued Feb. 2, 1971, U.S. Pat. No. 3,616,983 issued Nov. 2, 1971, U.S. Pat. No. 4,344,381 issued Aug. 17, 1982 and U.S. Pat. No. 5,279,863, issued Jan. 18, 1994, electrostatic coating has been considered one possibility. As disclosed in U.S. Pat. No. 3,559,280, electrostatic spray coating is accomplished after water spray, sizing, straightening, and drying, and in the multiple steps and locations of a spraying or coating section, a separate following baking or hardening chamber, a separate following air blower and a separate following water spray. As disclosed in U.S. Pat. No. 3,616,983, electrostatic powder coating is accomplished as an alternative to other coating methods after earlier application of liquid coatings, and after heating applied by an external heater. As disclosed in U.S. Pat. No. 4,344,381, electrostatic spray coating is accomplished in an inert atmosphere by organic solvent-based, liquid coating materials.

U.S. Pat. Nos. 3,122,114; 3,226,817; 3,230,615; 3,256,592; 3,259,148; 3,559,280; 3,561,096; 4,344,381; 4,582,718; 4,749,125; 5,035,364; 5,086,973; 5,165,601; 5,279,863; and 5,364,661, and PCT Publication No. WO 93/00453 are incorporated by reference.

SUMMARY OF THE INVENTION

Despite the advances of the art, opportunity has remained for invention in the application of coatings to zinc coated and uncoated tubing. The times and distances for coatings to be applied and cured have created at least in part barriers to increases in speeds in the continuous in-line production of tubing. Overspray, drippage and the like have caused substantially incomplete usage of coating materials, and wastage. Coatings have been inconsistent in thickness and coverage, and thicker than needed.

In summary, therefore, the invention is both tube products and improvements in the methods of continuous production of coated tubing. As most preferred, the tubing and improved production include hot dip galvanize zinc coating of tubing, and before solidification of the zinc coating, in-line, clear coating of the tubing with organic polymer coating. The remaining latent heat of the galvanzing cures or thermosets the clear coating, and the clear coating preserves a consistency and shine, or reflectivity, of the zinc previously unseen in the finished products of continuous zinc coating of tubing, in the range of chrome. In additional embodiments, organic polymer coatings are applied to zinc coated and uncoated tubing, and the organic polymer coatings are applied by electrostatic application of powder. The powder is uncharged as it leaves its nozzles, and charged in fields created by an array of charged wire grids. The powder thermosets to coat the tubing in approximately five seconds, and coating is completed without liquid coating materials, applied heat, or any baking or hardening chamber.

The full scope the invention, and its objects, aspects, and advantages will be fully understood by a complete reading of this specification in all its parts, without restriction of one part from another.

BRIEF DESCRIPTION OF THE DRAWING

The preferred embodiment of the invention will now be described with reference to the accompanying drawing. The drawing consists of four figures, as follows.

DETAILED DESCRIPTION OF THE PRESENT INVENTION

Figure 1:
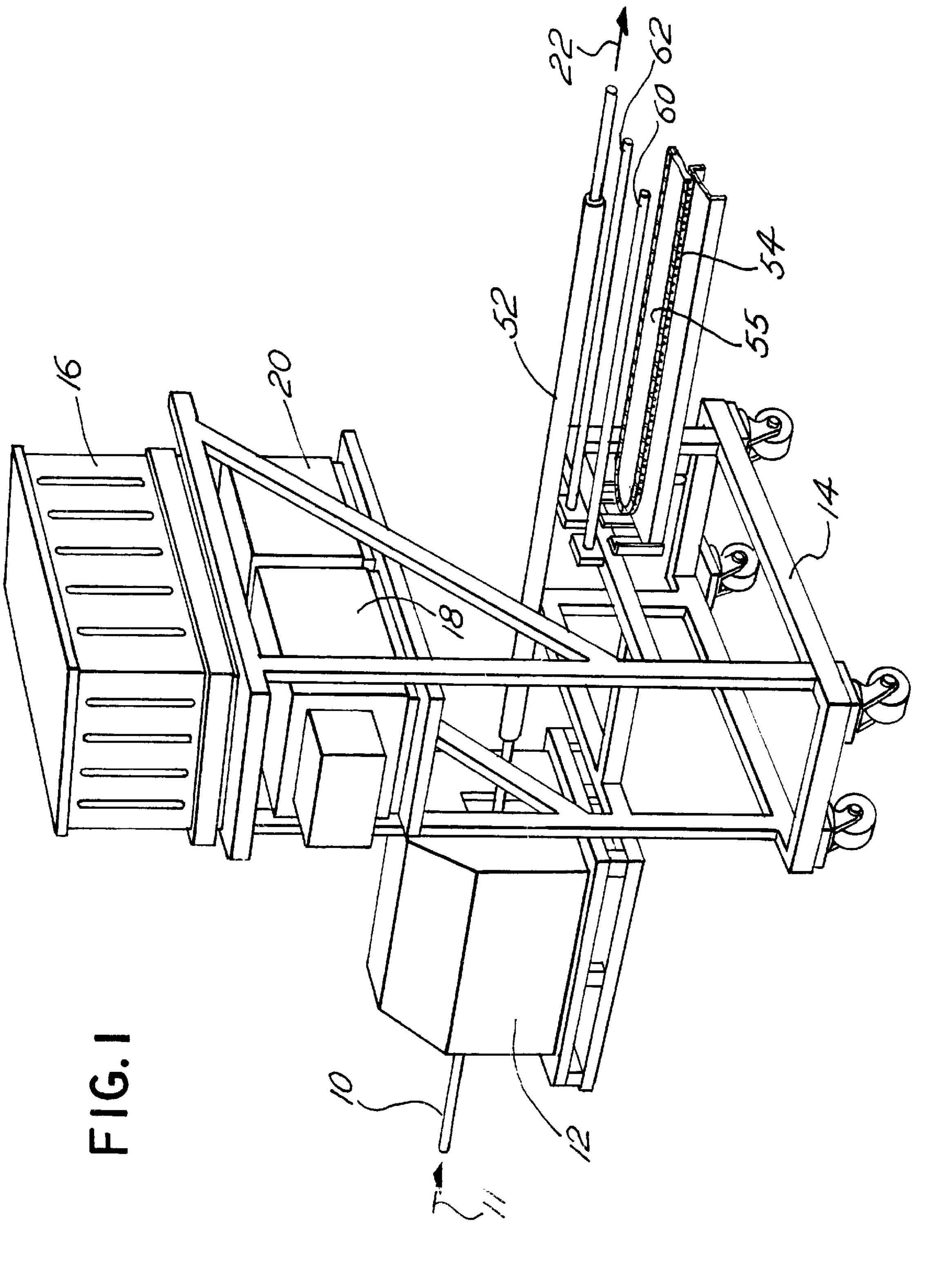
FIG. 1 is a perspective view of the equipment of practice of the preferred embodiment of the invention in a tube production mill.

A preferred embodiment of the invention is practiced in a process and with equipment as shown in FIG. 1. Tubing 10, previously formed from strip steel and previously welded, moves into and through a coater 12 in the direction of arrow 11. Auxiliary equipment of the coater 10 is mounted on a rack 14. Powder for coating the tubing 10 moves from a fluidized bed 16 through augers 18, 20, into nozzles not shown in FIG. 1 and is broadcast into the coater 12. The powder coats the tubing 10, which exits the coater 12 in the direction of arrow 22.

Figure 2:
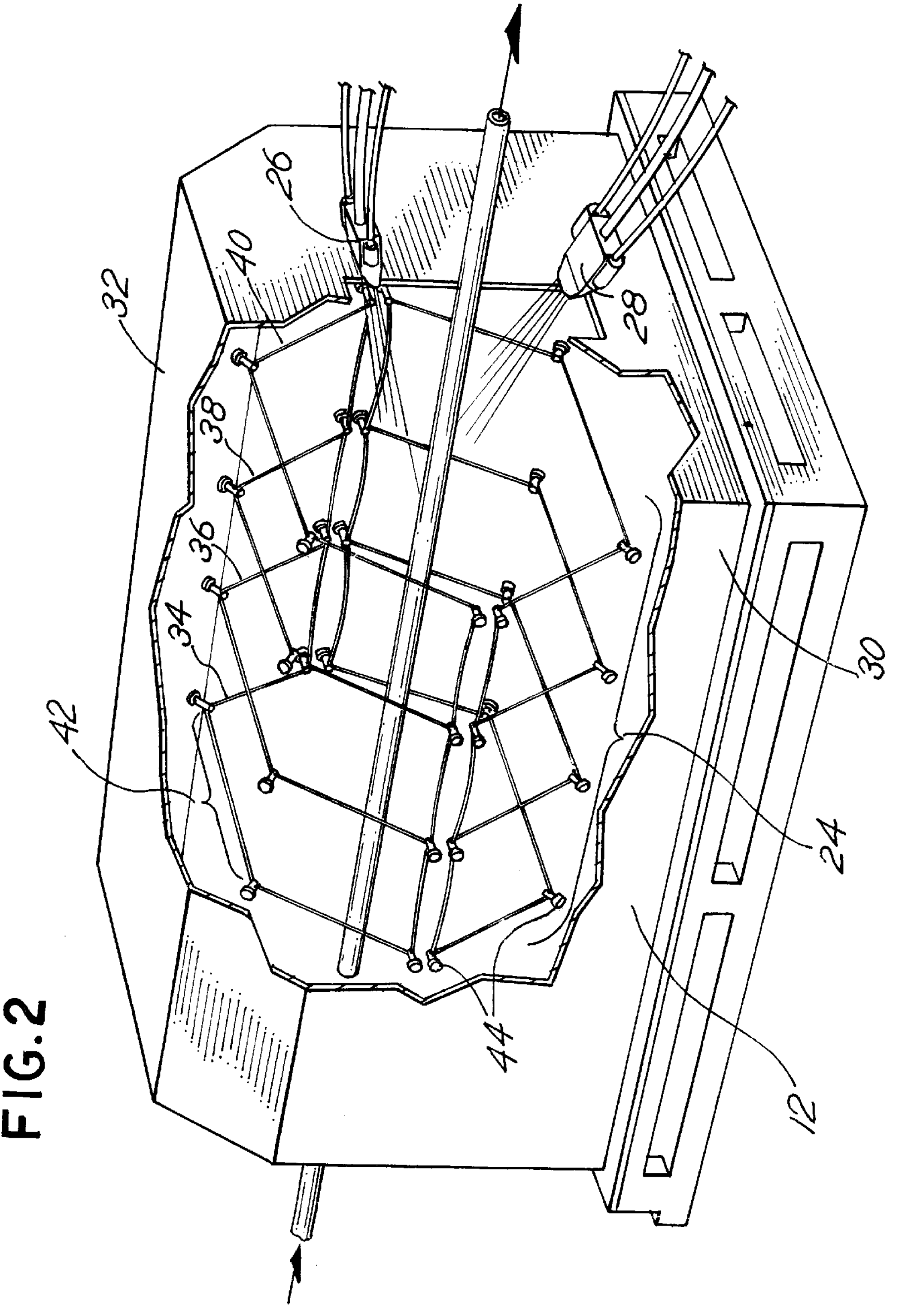
FIG. 2 is a second perspective of apparatus of the preferred embodiment, namely a coater, broken away to reveal internal detail.

Referring to FIG. 2, the coater 12 houses an array 24 of charged electrical wires which establish an electrostatic field or fields about the tubing 10 passing through the coater 12. The nozzles not shown in FIG. 1 are nozzles 26, 28 in FIG. 2, and as shown in FIG. 2, the nozzles 26, 28 broadcast powder into the array 24. The tubing 10 is grounded and powder, charged by the array 24, moves through the electrostatic field(s) of the array to settle on the tubing 10. To any extent it does not settle on the tubing, the powder is exhausted from the coater 12 and recovered for reuse.

Referring again to FIG. 2, the tubing 10 is preferably tubing as formed from continuous metal strip pulled through a series of tube forming rollers to bring the lateral edges of the strip together and form the strip into a circular cross-section. When the lateral edges are adjacent each other, they are welded, in-line, as known from past practices. With or without additional operations, the tubing proceeds into the coater 12 in the condition of being formed and welded tubing.

From the location of removal from supply rolls, to the location in which the tubing is cut into sections, the strip which forms the tubing and the resulting tubing proceed in a continuous line along a single, continuous central axis. Thus, the axis of the tubing defines a longitudinal direction along the direction of tubing movement, and transverse axes perpendicular to the longitudinal axis. Further, the direction of movement is toward the "downstream" or "front" and the direction opposite the direction of movement is "upstream" or to the "rear." The whole of the process forms a tube production mill or tube mill.

The coater housing 30 as shown takes the form of a substantially rectangular box, with its major dimension, i.e., its length of a few feet, in the longitudinal direction. Modifying the rectangularity, a top 32 slopes inward toward the axis of the tubing 10 in the upstream direction. The slope of the top aids in directing unapplied powder toward an exhaust, not shown, in the rear bottom of the coater 12.

As shown, the array 24 includes four grids 34, 36, 38, 40 of wire segments such as segment 42. Four grids are currently preferred, spaced approximately six to seven inches apart, although other numbers of grids and distances of spacing are considered acceptable. Each grid extends in a transverse plane, and each grid is a hexagon of wire segments centered on the axis of the tubing 10. Hexagons are also currently preferred, although circles and other shapes are considered acceptable. Hexagons appear to provide the best symmetry for tubing of circular cross-section.

The grids 34, 36, 38, 40 are electrically isolated from surrounding support structure, not shown, by insulators such as insulator 44, and the grids are charged to approximately 50,000 volts with a current of milliamps for a 1.25 inch outer diameter tube and a minimum tube to grid distance of three to four, more or less, inches. For larger diameter tubing, distance is inherently reduced between the wires of the grids and tubing, and voltage is proportionally reduced. For smaller diameter tubing, voltage is proportionally increased, to a maximum of about 60,000 volts.

The tubing is grounded, as above, and the difference of potential between the grids 34, 36, 38, 40 and the tubing 10 charges powder entering the array. Powder is uncharged as it leaves the nozzles 26, 28 and initially enters the array, and becomes charged on entry. As a corollary, the nozzles 26, 28 are also uncharged. Advantages of the initially uncharged powder and uncharged nozzles are reduction of the tendency of the powder to form cobwebs from the grids to the nozzles, and independence of the powder broadcasting function of the nozzles and the electrostatic function of the grid.

The four grids 34, 36, 38, 40 each form an electrostatic field centered on the planes in which they lie, and thus, powder broadcast through the grids experiences up to four electrostatic fields. The spacing of the grids is understood to cause the electrical fields of the grids to be essentially independent from each other, and such independence is considered preferable.

Referring again to FIG. 1, powder is initially placed in bulk in tie fluidized bed 16. As typical of fluidized beds, the bed 16 contains a membrane, with powder above and a gas chamber below. Powder in the fluidized bed 16 is forced from the fluidized bed under pressure, to the twin augers 18, 20. Auger 18 feeds the lower nozzle 28, auger 20 feeds the upper nozzle 26. The gas chamber of the bed 16 is supplied with nitrogen, which is inert and dry, and passes through the membrane, conditioning the powder above against compaction. A standpipe for each auger begins in the fluidized bed above the membrane and extends downward through the bed into a powder storage area of the auger. A level sensor in the auger powder storage chamber responds to powder level in the auger powder storage chamber to actuate a cone valve in the standpipe, to permit powder to enter the standpipe and thereby drop to the auger. Each auger is from AccuRate Bulk Solids Metering, a division of Carl Schenck AG, and each auger includes a screw or auger by which powder is conveyed from the auger toward the coater 12.

While augers are currently preferred, brush feeders are considered an acceptable alternative.

Figure 3:
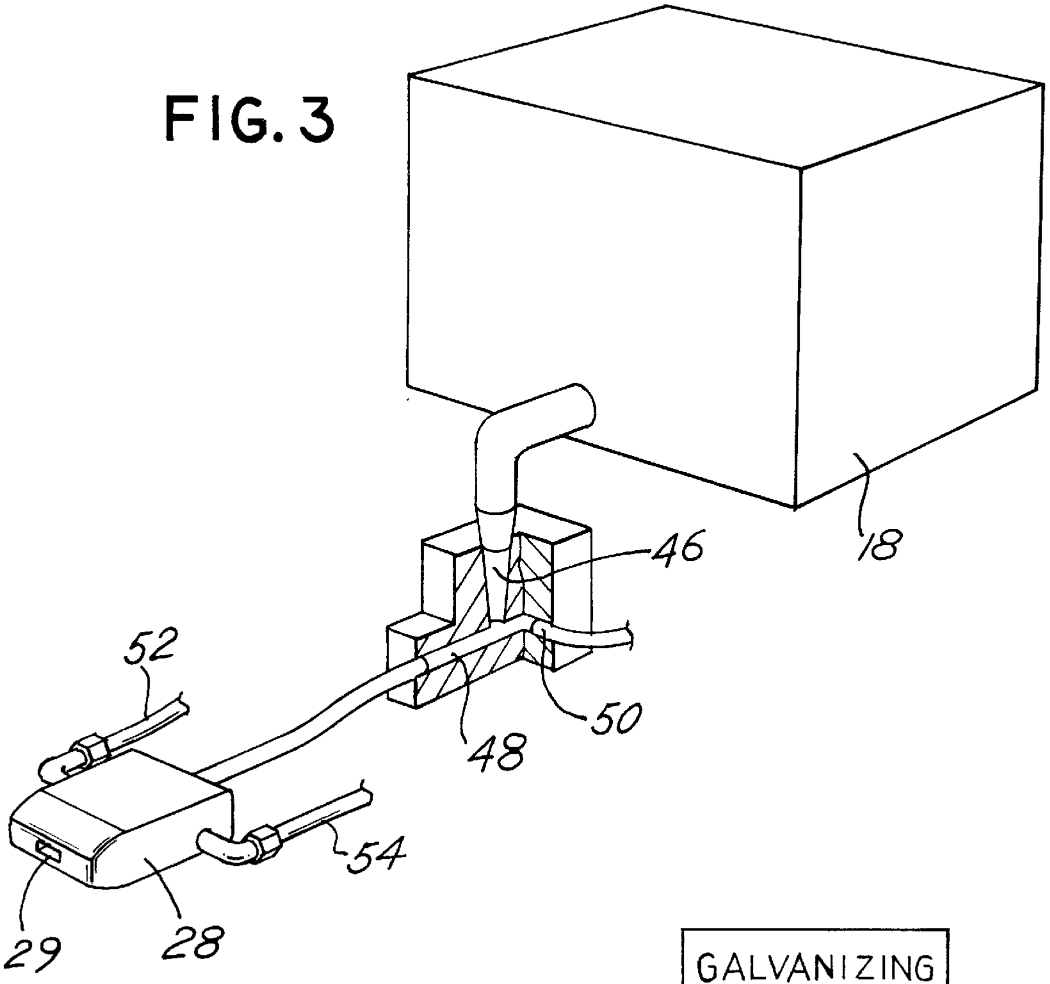
FIG. 3 is a schematic of the powder feeding apparatus of the preferred embodiment.

Referring to FIG. 3, powder drops from the augers such as auger 18 through a tapered passage 46 in a connector block 47 into a narrowed passage 48 to which nitrogen is supplied at its elbow 50. The drop from the auger to the elbow 50 is under action of gravity; powder moves from the elbow 50 to the nozzles such as 28 under pressure of nitrogen. Additional nitrogen supplied at the nozzle through inlets 52, 54, aids in projection of the powder from the nozzle outlet 29.

As shown in FIG. 2, the nozzles 26, 28 point, are directed, and project powder, in the longitudinal direction of the tubing. The nozzles also point and project powder in the upstream direction. The nozzles thereby cause the powder to form an axial cloud about the tubing as the powder leaves the nozzles.

While two nozzles, above and below the tubing, are currently preferred, two nozzles on each side, and three and more nozzles in alternate configurations, are considered acceptable. Further, the nozzles may point, and direct powder, downstream, from the rear of the coater 12.

The powder utilized in the invention is a thermoset polyester. More specifically, the powder is triglycidyl isocyanurate (TGIC) thermoset clear polyester, essentially resin with trace amounts of accelerators. The powder is a cross-linking polyester, as opposed to air dried or non-crosslinked polyester, and is fast curing. Preferably, the powder cures or thermosets in five seconds or less at 500 to 600 degrees Farenheit (F), with melting occurring at approximately 275 F. Most preferably, the powder is X23-92-1 clear polyester from Lilly Powder Coatings, Lilly Industries, Inc., Kansas City, Mo. TGIC polyester is preferred for the impervious nature of its cross-linked barrier coating, the maintenance of its mechanical and physical properties in a range of thickness from about 0.1 mil to about 3.0 mil, its scratch resistance, and its resistance to chemical degradation from MEK, alcohols, caustic solutions and mild acids.

The speed of the tubing as it moves through the coater 12, and the thickness of the coating applied in the coater, are related to each other. As shown and described, the coater 12 is capable of a coating of 1 mil thickness with a "line speed" of 500 feet per minute, and alternately, a coating of ½ mil thickness at 1000 feet per minute. For combinations of greater thicknesses and greater speeds, a second coater, back-to-back with the first, may be appropriate.

A 1.25 inch outer diameter tubing has a surface area of 0.3278 square feet per linear foot, and with a line speed of 500 feet per minute, the application rate of the coater, defined as the pounds of powder utilized per minute in the coater, is approximately 1.03 pounds per minute, or 461.3 grams per minute. With a 1.510 inch outer diameter tubing, and a surface area of 0.3958 square feet per linear foot, and a line speed of 500 feet per minute, the application rate is 74.63 pounds per hour, or 557.25 grams per minute. A lighter powder requires a lower rate; a heavier powder requires a higher rate.

With a coater 12 as shown and described, a coating may be applied to the tubing in any desired location among the steps by which the tubing is formed. The preferred coating material requires a temperature of 500 to 600 degrees F to cure, and sufficient space along the line for curing in five seconds. The heat for this temperature may be supplied as in past coating processes through pre-heating of the tubing by induction heaters.

On start-up, tube mills as contemplated often pass discontinuities of formed and unwelded strip down the line. The open slit which is to be otherwise closed by welding often steams. Vapors from such a slit are deleterious to the coater 12. Referring to FIG. 1, in the preferred coater, a shield 52 is placed in the line and tubing passes through the shield 52. While the coater 12 is operating and welded tubing is being coated in the coater 12, the shield 52 is in the illustrated, retracted position, outside the coater 12. With any interruption of the mill or line, however, the shield 52 is movable longitudinally along the tubing between the nozzles 26, 28, to an advanced position inside the coater 12, to protect the interior of the coater 12 from any steaming section of tubing. The shield 52 is movable between the advanced and retracted positions under the action of a chain drive 54. The drive 54 moves a cam attached to a link of the chain in an oval motion about an oval track 55. The cam extends into a transverse slot in a cam follower (not shown). The cam follower is restricted to longitudinal, linear motion along a pair of parallel shield tubes 60, 62 by virtue of including a tube follower (not shown) fitted on the tubes 60, 62 for sliding along the tubes. Thus, whenever necessary to protect the interior of the coater 12 against discontinuities in the tubing, the shield 52 may be readily moved upstream into the coater 12, and whenever appropriate to clear the shield 52 from the coater 12, the shield 52 may be moved downstream outside the coater 12.

Figure 4:
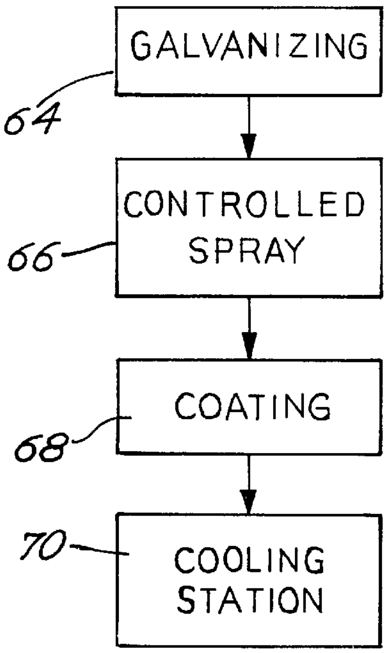
FIG. 4 is a flow diagram of the placement of the coating apparatus as most preferred in the tube mill.

While the described coater 12 may be placed in any desired location of the equipment by which tubing is formed, welded and coated, consistent with the necessities of its placement as described, and while the heat for curing may be supplied by induction and other heating units, a specific placement of the coater 12 and specific source of curing heat is particularly desired. Referring to FIG. 4, the coater 12 is most preferably placed downstream of a zinc coating bath or other zinc coating or galvanizing apparatus 64. As in past and more current processes, zinc is applied to the tubing in such an apparatus by zinc bath, pumping through a cross-tee, spray through a conical curtain, or bathing from a gooseneck tube. Also as in such apparatus and processes, an air knife or wipe may adjust thickness of the zinc coating applied in the apparatus.

A controlled spray 66 follows the galvanizing step in the tube formation process. The spray is water directed at the tubing, and it drops the temperature of the exterior of the tubing to a range, of approximately 500 to 600 degrees F. Zinc in a galvanzing step is typically kept at 850 to 900 degrees F, and to prevent solidification of the zinc by transfer of heat to the tubing, the tubing entering the galvanizing step and apparatus is typically heated to the temperature of the zinc. In some case, the zinc may reach 1100 degrees F through tubing-supplied heat. The temperature drop accomplished by the controlled spray is a temperature drop at the tubing surface of 50 to 100 or more degrees F, again, to a range of 500 to 600 degrees F.

The temperature and quantity of water utilized in the spray 66 is dependent on the line speed of the tubing, the temperature of the galvanizing step, the diameter of the tubing and the like. In trial runs, water sprayed from an array of twenty seven nozzles spaced circumferentially and longitudinally about the tubing required approximately one gallon per minute total of ambient temperature water. Adjustment of the quantity of water utilized in spray 66 for a specific line is committed to the person of ordinary skill in the art in the exercise of such ordinary skill.

Tubing leaving the galvanizing step of production has a chrome-like, consistent and highly reflective appearance. In contrast, tubing exiting complete tube production has the conventional mottled and dull appearance of galvanized materials. Thus, the chrome-like appearance of tubing leaving the galvanizing step has in the past been an ephemeral or highly transient and unstable phenomenon. It is understood that the mottled and dull appearance of conventionally galvanized materials is the result of water quenching of the materials, and that in the past, no techniques or processes have varied the mottled and dull appearance of zinc coatings.

In contrast to past quenching, the controlled spray 66 "captures" or temporarily maintains the chrome-like appearance of tubing upon exiting the galvanizing step.

Thus, the controlled spray 66 captures surface appearance by controlled surface cooling and yet maintains latent heat in the tubing leaving the spray 66. As used in this description, "latent heat" is intended to mean, unless otherwise defined by the context, heat retained in tubing primarily as a result of processing steps which incidentally heat the tubing, and is meant to exclude heat caused primarily or completely by applied heating through heaters.

As a consequence, and when the tubing exits the controlled spray 66 and next enters the coater 12, as desired, the tubing retains latent heat of the galvanizing process which is correct to accomplish curing of the powder coating applied in the coater. Placement of the process steps and equipment as described results in freedom from any requirement of applied heating to accomplish coating in the coater 12. Substantial energy savings are realized.

As implicit, the coater 12 and spray 66 are associated in position in the tube mill such that the clear coating applied in the coater 12 is immediately over the galvanizing coating on the tubing, as applied in the galvanizing step. "Immediately over" in reference to coatings is intended to mean, unless otherwise defined by the context, that the exterior coating is applied over and in contact with the described interior coating without an interposed coating or other material.

The consequence of the sequencing of steps of tubing production shown and described is that the clear coating of the coater 12 "captures" the chrome-like appearance of the galvanizing coating of the tubing permanently. When the tubing is quenched, as in step 70, following coating 68, the quenching occurs in contact with the clear coating, not in contact with the galvanizing coating, and the galvanizing coating is neither mottled nor dulled. The galvanizing coating is further sealed by the clear coating against oxidation.

Again, the consequence is that the zinc coating is visible through the clear coating and retains the shine more of chrome than of cooled zinc, and improves and distinguishes the tubing resulting from the described processes, as a matter of kind, not degree.

Further, the consequence of the sequencing of steps as shown and described is that the polyester coating of the coater 12 thermosets or cures without addition or inclusion of a baking or hardening chamber following the coater 12. The coating cures in transit to subsequent steps of tube formation, such as quenching the heat of galvanizing after overcoating, which have essentially nothing to do with the overcoating process or apparatus.

The tubing resulting from the processes described and as invented is chrome-like, galvanized, clear polyester overcoated, highly resistant to contact damage, chemical degradation, and otherwise highly desirable.

The preferred embodiments and the invention are now described in such full, clear, concise and exact language as to enable a person of ordinary skill in the art to make and use the invention. To particularly point out and distinctly claim the subject matter regarded as invention, the following claims conclude this specification.

We claim:

1. In a tube product of the type comprising a metal base tube with or without a zinc coating and with an overlying coating of organic polymer, the improvement comprising said coating of organic polymer consisting essentially of a thermosetting, cross-linking polyester, said polyester being triglycidyl isocyanurate (TGIC) polyester applied immediately over the metal base tube, without a primer, wherein the tube product was formed from a process including applying the TGIC polyester as a powder to the metal base tube during traveling of the tube.

2. The improved tube product of claim 1 wherein said polymer was electrostatically applied to the metal base tube.

3. The improved tube product of claim 1 wherein the zinc coating is a zinc galvanized coating applied to the metal base tube and the organic polymer is applied over the zinc galvanized coating.

4. The improved tube product as in claim 1, claim 2, or claim 3, wherein the organic polymer is clear.

5. The improved tube product of claim 4 wherein at least substantial portions of the zinc coating, as observed through the clear polymer coating, has the reflectivity of chrome.

6. The improved tube product of claim 1 wherein the metal base tube was formed from a metal strip, and wherein the tube was heated to achieve a latent heat sufficient for thermosetting the polymer and wherein the tube product with the coating was cut into separate tube products.

7. The improved tube product of claim 1 wherein the metal base tube was formed from a metal strip, wherein molten zinc formed a hot dip galvanized coating on the outer surface of the metal base tube, wherein the hot dip galvanized coating was cooled to a temperature less than necessary to achieve a latent heat sufficient for thermosetting the organic polymer coating, wherein the tube was reheated to achieve an applied heat sufficient for thermosetting the organic polymer coating, wherein the organic polymer coating was thereafter applied to the tube and the tube was cut into individual tube products.

8. The improved tube product of claim 1 wherein said metal base tube was formed from a metal strip, wherein a hot dip galvanized coating was formed on the outer surface of the metal base tube, wherein the hot dip galvanized coating was cooled to achieve a latent heat sufficient for thermosetting the organic polymer coating, wherein the organic polymer coating was applied immediately over the hot dip galvanized coating, and wherein the tube was cut into individual tube products.

9. The improved tube product of claim 1 wherein the tube product formed from a metal strip, wherein the metal base tube had a hot dip galvanized coating on the outer surface wherein the hot dip galvanized coating was cooled to ambient conditions, wherein the metal tube was heated to a temperature for thermosetting the organic polymer coating, wherein the organic polymer coating was applied immediately over the hot dip galvanized coating, and wherein the tube was cut into individual tube products.

10. The improved tube product of claim 1 wherein the organic polymer is pigmented.

11. The improved tube product of claim 1 wherein the polymer coating has a thickness in the range of 0.1–3.0 mls.

12. The improved tube product of claim 1 wherein the coating is scratch resistant, corrosion resistant, and resistant to chemical degradation.

13. In a tube product of the type comprising a metal base tube with a zinc coating and with an overlying coating of organic polymer, the improvement comprising a polymer of a thermosetting, cross-linking polyester, said polymer consisting essentially of a thermosetting, cross-linking polyester, said polyester being triglycidyl isocyanurate (TGIC) polyester applied immediately over the metal base tube, without a primer, said polymer being clear, and wherein at least a substantial portion of said zinc coating, as observed through the clear polymer coating, has the reflectivity of chrome.

14. The improved tube product of claim 13 wherein the polymer is applied to the metal base tube in the form of a powder.

15. The improved tube product of claim 14 wherein said powder is electrostatically applied.

16. The improved tube product of claim 13, claim 14, or claim 15 wherein the polymer has a thickness in a range of 0.1–3.0 mls.

17. The improved tube product of claim 13, claim 14, or claim 15 wherein the coating is scratch resistant, corrosion resistant, and resistant to chemical degradation.

18. The improved tube product of claim 13, claim 14, or claim 15 wherein the organic polymer is pigmented.

* * * * *